Jan. 3, 1961  G. B. DYER ET AL  2,966,700
PRODUCTION OF THERMOPLASTIC SEAMLESS TUBING
Filed Aug. 27, 1958  3 Sheets-Sheet 2

Inventors
**GERALD B. DYER
WARNER P. HEINSTEIN**

By *Allan R Plumley*

Attorney

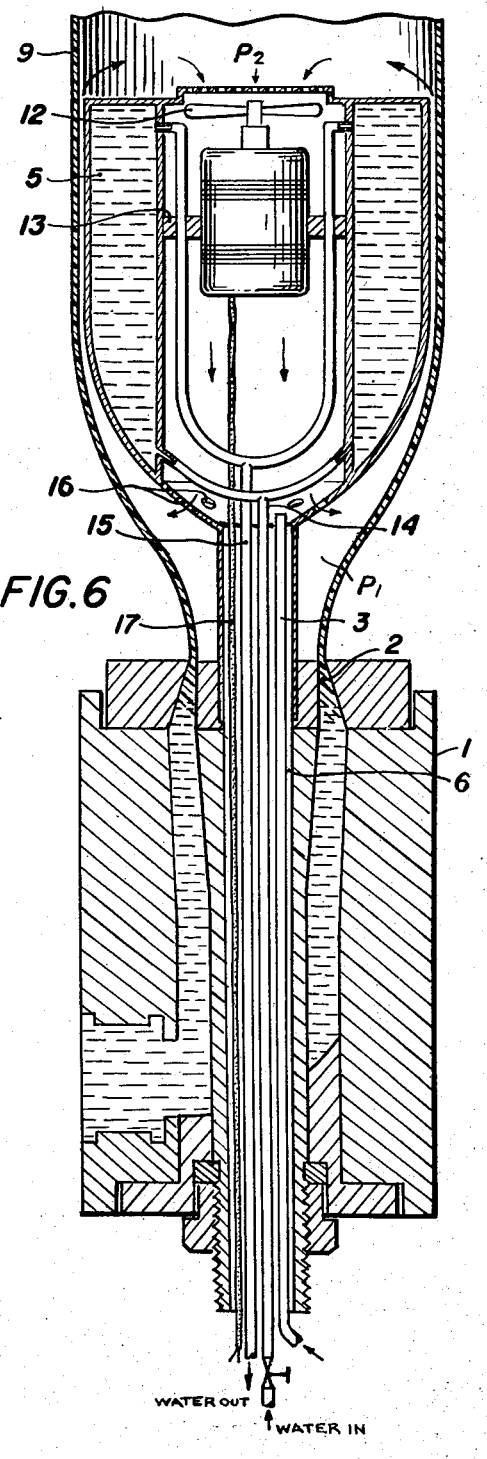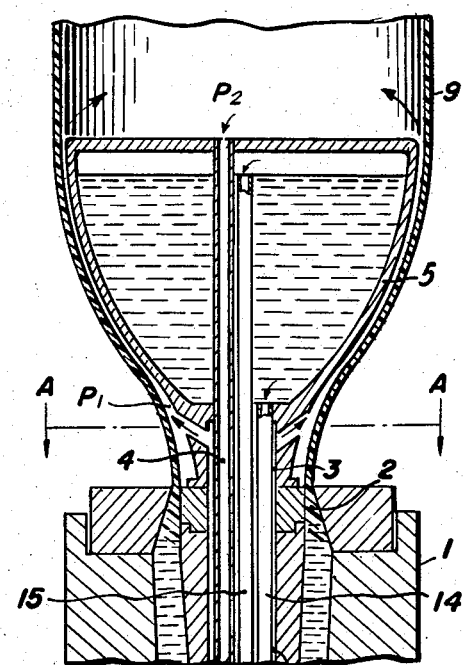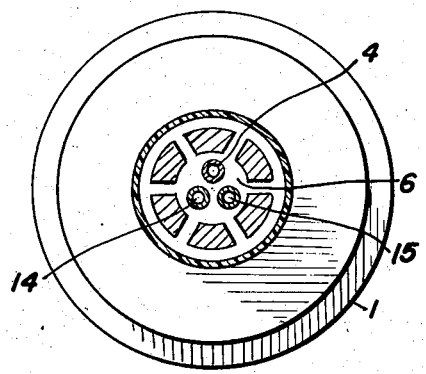

000# United States Patent Office 2,966,700
Patented Jan. 3, 1961

2,966,700

PRODUCTION OF THERMOPLASTIC SEAMLESS TUBING

Gerald Benjamin Dyer, La Salle Park, Ontario, and Warner Paul Heinstein, Collins Bay, Ontario, Canada, assignors to Du Pont Company of Canada (1956) Limited, Montreal, Quebec, Canada, a corporation of Canada Filed Aug. 27, 1958, Ser. No. 757,635

11 Claims. (Cl. 18—14)

This invention relates to thermoplastic tubing and more particularly to an improved method and apparatus for producing continuous seamless tubing from thermoplastic organic materials.

This application is a continuation-in-part of our pending application Serial No. 698,204, filed November 22, 1957, and now abandoned.

The method commercially used for forming continuous seamless tubing from thermoplastic materials involves extruding the thermoplastic material in molten condition through an annular die to form seamless tubing which is drawn from the die by wind-up rolls driven at a speed sufficient to stretch the tubing while in the formative plastic state. Between the point of extrusion and the wind-up rolls the tubing is inflated to a predetermined diameter by means of air or other gaseous media to form an isolated gaseous bubble confined between the extrusion die and the nip of the wind-up rolls. Setting of the inflated thermoplastic tubing is accomplished by directing and applying a controlled volume of an external flow of air on and around the tubing. For a given die, the diameter and the wall thickness of the tubing are controlled by proper adjustment of the rate of draw, the amount of air introduced into the bubble, the position of the external air cooling jets or rings, the temperature and volume of the external cooling air and the temperature of the extruded thermoplastic material.

In the above described process, inflation of the tubing occurs when the wall thickness of the section emerging from the die has been reduced by drawing in the plastic formative state until the melt tension of the polymer in this zone has been overcome by the pressure within the bubble. The diameter of the tubing is regulated by careful adjustment of this pressure and the volume of cooling air directed on the walls of the tubing. If the interior pressure is too great the tubing may expand beyond the diameter desired, periodic over-expansion may occur or the tubing may actually rupture. These undesirable results may be controlled to a degree by increasing the volume of cooling air. The latter is limited by the length of the cooling tower and by distortion produced in the tubing as the velocity of the cooling air is increased. Furthermore, in this process the zone in which expansion occurs moves away from the die as the extrusion rate is increased. This results in a loss in tubing area over which cooling can be accomplished and hence places a ceiling on productivity.

An object of this invention is to isolate the zone of inflation of the tubing from the rest of the process. A further object is to force the inflation of the tubing to occur at any point desired in the zone where the tubing is in the plastic formative state. A further object of this invention is to materially increase the rate of tubing production over that heretofore possible commercially. A further object is to eliminate the effect of periodic over-expansion of the tubing with attendant loss of tubing production. Still further objects will appear as the description proceeds.

These objects are accomplished in accordance with the present invention by a process involving the use of two pressure zones in the inflated tubing between the extrusion die and the wind-up roll. The first pressure zone is near the extrusion die and the pressure in this zone is sufficient to cause expansion or blowing of the tubing to the desired diameter while it is still in the plastic formative state. The second pressure zone is between the point at which expansion of the tubing to the desired diameter has been accomplished and the nip of the wind-up roll and the pressure in this zone is lower than that in the first zone. In fact, the pressure in this second zone is just sufficient to maintain the desired diameter of the tubing but too low to cause further blowing or expansion. This objective and the means of providing the two different pressure zones in the inflated tubing is achieved by using the apparatus illustrated in the drawings in which like reference numerals refer to like parts.

Figure 5 shows a schematic representation of alternative equipment in which the plate 5 of Figure 1 is in the form of shaper designed to follow the contour of the tubing and adapted to internal cooling by means of a circulating flow of water or other cooling liquid medium.

Figure 6 is a schematic representation of a modification of the pressure differential equipment illustrated in Figure 2 as adapted to produce internal cooling of the tubing.

Figure 7 is a transverse section taken along the lines A—A in Figure 5.

Figure 1:
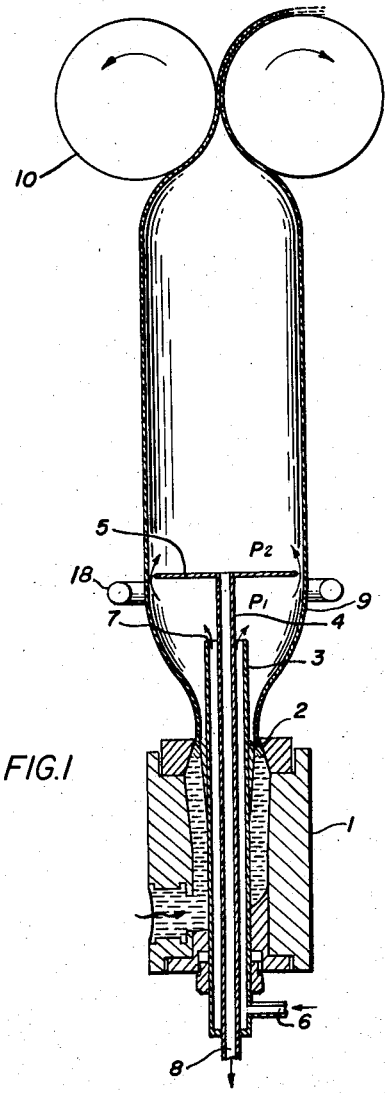
Figure 1 shows a schematic representation of a tubing extrusion apparatus provided with equipment which will establish the two pressure zones in accordance with this invention.

In Figure 1, a die 1 is provided with an annular orifice 2 through which the thermoplastic material is extruded to form the tubing 9. Through the centre of the die 1 is fixed a tube or pipe 3 having an air inlet 6 at its lower end. Concentrically positioned within the tube 3 is a second tube or pipe 4 of smaller diameter. The lower end of the tube 4 may be left open to the atmosphere or partially closed with a valve (not shown) as may be desired. The upper end of the tube 4 is attached to a concentric plate or flat disc 5.

Figure 2:
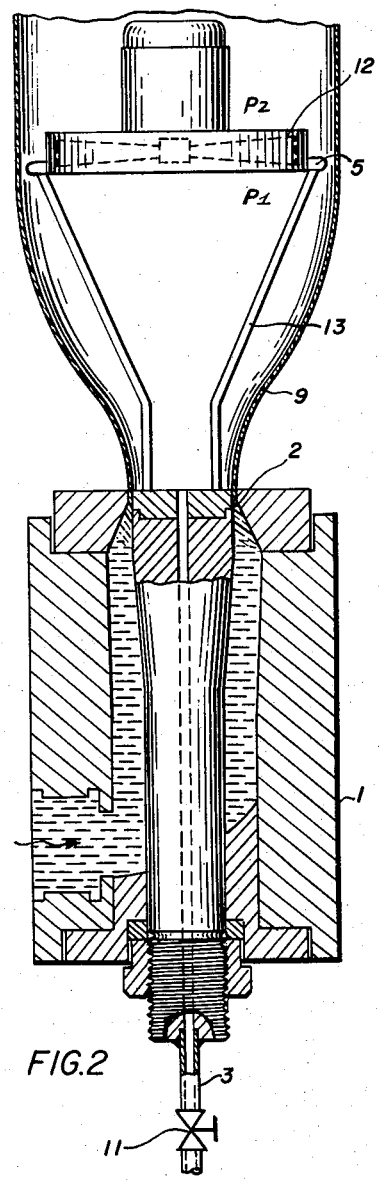
Figures 2 and 3 show schematic representations of alternative equipment which will also produce the desired effect.

In Figure 2, a tube 3 is positioned through the centre of the die 1, this tube having at its lower end a valve 11 while its upper end is open at the top plane of the die 1. Through an opening in the concentric plate 5 is positioned a fan 12, the plate and fan assembly being mounted on the top of the die 1 by brackets 13.

Figure 4:
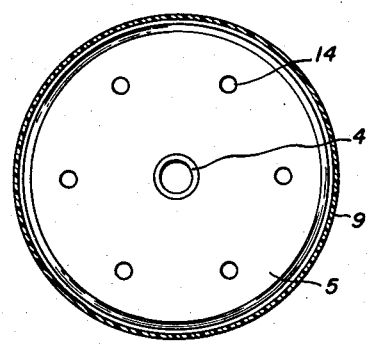
Figure 4 is a transverse section taken along the line A—A' in Figure 3.
Figure 3:
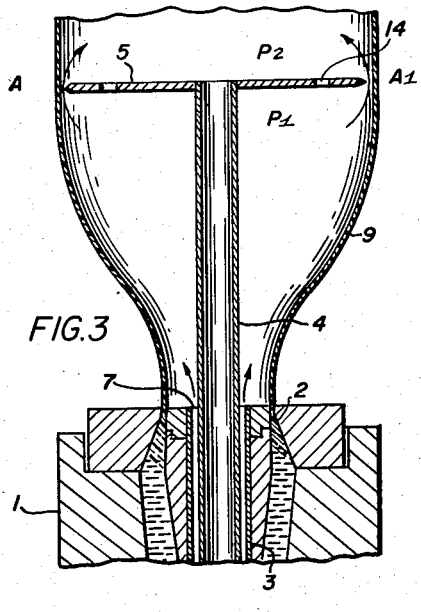

In Figure 3, a tube 3 is fixed through the centre of the die 1 and another tube 4 of smaller diameter is concentrically positioned within tube 3. The upper end of tube 4 is attached to the concentric plate 5 which in this instance has a series of holes 14 therethrough. The arrangement of the lower ends of tubes 3 and 4 is not shown but is the same as in Figure 1. The position of the holes 14 in plate 5 is illustrated in Figure 4.

In Figure 5 the shaped cooler 5 is provided with a water inlet 14 and a water outlet 15. In effect the shaped cooler replaces the plate illustrated and described in Figure 1.

Figure 6 illustrates a system essentially the same as that illustrated in Figure 2 but with the further modification that the plate 5 of Figure 2 is replaced by the shaped cooler 5 of Figure 6. This comprises a water jacket through which water or other cooling medium is circulated by means of inlet pipe 14 and outlet pipe 15. Mounted within the shaped water jacket cooler 5 by brackets 13 is a fan assembly 12, the current for running the fan and grounding the motor of assembly 12 being led in through the die by cable 17.

In the operation of the process, the molten thermoplastic material is extruded from the die 1 through the annular orifice 2 to form the tubing 9. Air is introduced into the tube 3 and emerges above the die 1 in the zone $P_1$ formed by the upper plane of the die 1 and the plate or shaped cooler 5. In Figures 1 and 3 the air emerges from the passage 7 defined by the concentrically positioned tubes 3 and 4 while in Figures 2 and 6 it emerges from the single tube 3. The air emerging in the zone $P_1$ inflates the tubing so that it passes the edge of the plate or the side of the shaped cooler 5. The tubing is then drawn upwards in a substantially vertical direction by means of wind-up rolls 10, the nip between the wind-up rolls serving to entrap the air in the tubing 9 between the nip and the orifice 2 in the form of a bubble. At the point where the tubing 9 emerging from the orifice 2 begins to expand or blow it is cooled and partially set by a flow of air directed onto the exterior surface of the tubing 9 by means of a conventional air ring or air jets 18. In certain instances film embrittlement which appears to be due to high machine directional molecular orientation is encountered. This can be largely overcome by increased heat transfer in the area of the expansion of the tubing and this is the purpose of the shaped cooler 5 illustrated in Figures 5 and 6.

The inflating air entering the zone $P_1$ emerges in the tubing 9 below the plate or shaped cooler 5 and builds up a back pressure in the zone $P_1$ until the tubing 9 expands enough to create a gap between the tubing 9 and the plate or shaped cooler 5. The air then escapes through this gap to the zone $P_2$ and so provides a cushion which keeps the tubing 9 from touching the plate or shaped cooler 5. The inflating air emerging from zone $P_1$ into zone $P_2$ is then bled off to atmosphere in Figures 1, 3 and 5 by means of tube 4. At the point 8 where it emerges to the atmosphere a valve or hydrostatic leg of liquid can be positioned to control the pressure in zone $P_2$ so that it is just sufficient to keep the tubing 9 inflated to the proper diameter but insufficient to cause further expansion. The open bubble system as illustrated in Figures 1, 3 and 5 is essentially an automatic diaphragm valve and hence the gap width between the tubing 9 and plate or shaped cooler 5 is self-adjusting once the critical pressure in zone $P_1$ has been reached. In Figures 2 and 6 which illustrate a closed system, the inflating air is admitted through the tube 3 to expand the tubing 9 to the desired diameter and the valve 11 is then closed. The pressure differential which expands the tubing 9 and provides for the air gap between the tubing 9 and the plate or shaped cooler 5 is then created by the fan 12 in plate or shaped cooler 5 which blows downward into zone $P_1$. In Figures 5 and 6, the fact that the shaped cooler 5 follows the contour of the expanding tubing means, of course, that the air in zone $P_1$ has a much more restricted volume than in Figures 1 or 2 but this can be readily compensated for by proper adjustment and control of the amount of air admitted to the system through the air duct 3. The essential feature of this aspect of the process is that the amount of air between the shaped cooler 5 and the tubing 9 must be sufficient to prevent contact between the tubing and the shaped cooler.

Accurate control of the expansion of the tubing is possible using the process and equipment described above to create two different pressure zones. Bubble formation always occurs close to the die so that much higher tubing production rates are possible. With the equipment illustrated in Figure 1 in which the inflating air in zone $P_1$ passes the plate 5 to zone $P_2$ and thence to the atmosphere under controlled conditions, production rates as high as 230 feet of tubing per minute have been achieved without periodic over-expansion of the tubing. With the same extruder and cooling tower and the conventional method of extrusion previously described maximum productivity has been limited to 60–80 feet per minute of commercially satisfactory tubing. The process described in the present invention therefore makes possible a considerable increase in productivity over previous processes.

The following examples are illustrative of the practice of this invention in the production of polyethylene tubing.

*Example I*

Using the equipment illustrated in Figure 1 with a 2 inch annular die, a 20 mil die gap, a 5 inch concentric plate between the zones $P_1$ and $P_2$ tubing was produced from a commercial polyethylene resin at a wind-up speed of 110 feet per minute with gauge of the tubing thickness ±0.1 mil of that desired. The bubble was stable and expansion occurred at the plate which was positioned 6 inches above the die face. The temperature of the molten polymer at the point of extrusion was 360° F. The pressure differential between the zones $P_1$ and $P_2$ across the plate was 15 mm. of water with an air rate through the bubble of 1.3 cubic feet per minute.

While the temperature at the point of extrusion in the above example was 360° F. further runs using temperatures of 325° F., 400° F. and 430° F. were made. At the higher temperatures, tubing was produced at rates up to 230 feet per minute. The pressure differential between the zones $P_1$ and $P_2$ across the plate was also found to increase somewhat at higher wind-up speeds. Thus at a production rate of 110 feet of tubing per minute the pressure differential is 15 mm. of water. At 155 feet per minute, the pressure differential is 17 mm. of water and at 195 feet per minute the pressure differential increases to 18 mm. of water. In all cases the pressure in zone $P_2$ above the plate was about 2 mm. of water.

Various runs were also made in which the height of the plate above the die face was varied from 4.5 inches to 16 inches. At any given extrusion rate film clarity and the balance of tensile properties between transverse and machine direction can be varied by altering the position of this plate.

*Example II*

Using the equipment illustrated in Figure 5 with a shaped cooler having an outside diameter of 6″ through the interior of which cooling water was circulated at the rate of 420 pounds per hour, 9″ wide polyethylene tubing was obtained at a wind-up speed of 130 feet per minute with gauge of the tubing thickness 0.9±0.2 mils. The extrusion temperature of the melt was 336° F. and the rate of extrusion was 67.5 pounds of polyethylene per hour. The cooling water inlet temperature was 9° F. and the outlet water temperature 23.4° F. The rate of air flow between the tubing and the shaped cooler was 0.15 cubic feet per minute.

In another run using the same type of equipment and the same wind-up rate to produce 12″ width tubing but with an extrusion temperature of 300° F., it was found that the rate of heat removed from the tubing during expansion was 2700 B.t.u.'s per hour. In this run the cooling water was circulated through the interior of the shaped cooler at the rate of 900 pounds per hour, the temperature of the cooling water at the inlet being 63° F. and 65° F. at the outlet.

*Example III*

Using the equipment illustrated in Figure 6, with circulation of cooling water through the jacket of the shaped cooler at 180 pounds per hour, 10″ width polyethylene tubing of 1.5 mil gauge ±0.3 was obtained at a tubing wind-up of 150 feet per minute and a rate of extrusion of 106 pounds of polyethylene per hour. In this instance, the temperature of the cooling water at the inlet was 68° F. and the temperature at the outlet was 93° F. The rate of air flow between the tubing and the shaped cooler was 0.035 cubic feet per minute.

*Example IV*

Using the equipment illustrated in Figure 6 with circulation of cooling water through the jacket of the shaped cooler at 1520 pounds per hour, 24" width polyethylene tubing of 0.50–0.80 mil gauge was produced at a tubing wind-up speed of 160 feet per minute and a rate of extrusion of 129 pounds of polyethylene per hour. The temperature of the cooling water at the inlet was 40° F. and the temperature at the outlet was 48° F. The extrusion temperature was 300° F. and the rate of heat removed from the tubing was 12,000 B.t.u.'s per hour.

The plate 5 in Figure 1 creating the two pressure zones $P_1$ and $P_2$ was a thin disc with a sharp edge. The plate edge may equally well be rounded or even comprise a ring of plastic material such as silicone which would give high slip properties or polytetrafluoroethylene which remains stable at exceedingly high temperatures. The design of the plate edge, however, is a relatively minor matter since essentially in the proper operation of the process the air passing from zone $P_1$ to zone $P_2$ provides an air gap or cushion which prevents the plate from contacting the tubing. As illustrated by Examples II, III and IV the plate may be replaced by a shaped cooler but in some cases where tubing embrittlement is not encountered, a shaper designed to follow the contour of the expanding tubing may equally well be used instead of a flat plate or a cooled shaper. The air passing between the plate or shaper and the tubing can also usefully be employed to carry agents designed to modify the properties of the inner wall of the tubing such, for example, as anti-blocking agents, film-printability improvers or any other type of agent designed to modify the surface of the tubing either chemically or physically.

The process has been described as applied to polyethylene but it can obviously be employed for the production of tubing from any thermoplastic film forming material such, for example, as polypropylene, polyamides, polyesters such as those described in U.S. 2,465,319, polyesteramides, polyacetals, polyvinyl chloride, polyvinylidene chloride and copolymers of vinyl chloride and vinyl acetate or vinylidene chloride and vinyl chloride. Also, while the process has been applied to vertical upward extrusion it can equally well be applied to downward or horizontal extrusion.

The embodiments of the invention in which an exclusive property or privilege is claimed are defined as follows:

1. In a method of producing a thermoplastic seamless tubing, the steps which comprise continuously dry extruding the molten thermoplastic material in the form of a seamless tubing, continuously withdrawing the tubing from the point of extrusion, flattening the tubing at a point spaced from the point of extrusion, maintaining a substantially constant continuous bubble of a gaseous medium in the section of tubing extending from the point of extrusion to the point of flattening, the gaseous medium in the bubble being under a differential pressure such that the pressure in the zone nearest the point of extrusion is sufficient to expand the tubing while in the plastic formative state to the desired diameter at a point beyond the point of extrusion while the pressure in the zone beyond the point of expansion is sufficient to keep the tubing expanded but insufficient to cause further expansion, and cooling said tubing between the point of extrusion and the point of expansion to the final desired diameter, the temperature of extrusion of the tubing, the rate of withdrawing the tubing, the degree of expansion of the tubing and the degree of cooling the tubing all being correlated in accordance with predetermined desired physical characteristics of the tubing.

2. A method as set forth in claim 1 in which the thermoplastic material is polyethylene.

3. A method as set forth in claim 1 in which said substantially constant continuous bubble of a gaseous medium is isolated.

4. A method as set forth in claim 1 in which said substantially constant continuous bubble of a gaseous medium is open to the atmosphere at a point before the point of extrusion.

5. A method of producing a polyethylene tubing which comprises continuously dry extruding a polyethylene in the form of a seamless tubing, continuously withdrawing the tubing from the point of extrusion, flattening the tubing at a point spaced from the point of extrusion, maintaining a substantially constant continuous bubble of a gaseous medium in the section of tubing extending from the point of extrusion to the point of flattening, the gaseous medium in the bubble being under a differential pressure such that the pressure in the zone nearest the point of extrusion is sufficient to expand the tubing while in the plastic formative state to the desired diameter at a point beyond the point of extrusion while the pressure in the zone beyond the point of expansion is sufficient to keep the tubing expanded but insufficient to cause further expansion, directing a controlled volume of cooling medium onto and around the exterior of said tubing, and cooling the interior of said tubing by means of a continuously circulating liquid cooling medium which is not in direct contact with said tubing, the temperature of extrusion of the tubing, the rate of withdrawing the tubing, the degree of expansion of the tubing and the degree of cooling the tubing all being correlated in accordance with predetermined desired physical characteristics of the tubing.

6. A method as set forth in claim 5 in which said substantially constant continuous bubble of a gaseous medium is isolated.

7. A method as set forth in claim 5 in which said substantially constant continuous bubble of a gaseous medium is open to the atmosphere at a point before the point of extrusion.

8. An apparatus comprising in combination, an annular extrusion die, means for extruding a molten thermoplastic material through said die in the form of continuous seamless tubing, means for admitting a gaseous medium into said tubing in proximity to said die, and means for causing a back pressure in said tubing in the vicinity of the point of extrusion comprising a circular plate attached to said die and spaced therefrom, said plate having an opening therein within which is positioned a fan operative to blow said gaseous medium in the direction of the die face and countercurrent to the flow of gaseous medium at the point of emission thereof into said tubing whereby the gaseous medium in a zone in said tubing between said die and said plate may be maintained at a pressure sufficient to expand the tubing while in the plastic formative state to the desired diameter at a point beyond the point of extrusion; and the gaseous medium in the tubing beyond said zone may be maintained at a pressure sufficient to keep the tubing expanded but insufficient to cause further expansion of said tubing.

9. An apparatus comprising in combination, an annular extrusion die, means for extruding a molten thermoplastic material through said die in the form of continuous seamless tubing, means for admitting a gaseous medium into said tubing in proximity to said die, means for removing said gaseous medium from said tubing at a point in said tubing beyond the point of emission of said gaseous medium into said tubing, and means for causing a back pressure in said tubing in the vicinity of the point of extrusion comprising a circular plate attached to said die at a point beyond the point of extrusion, said means for admitting said gaseous medium into said tubing comprising a tube inserted through the center of said die and terminating in proximity to the face of said die, and said means for removing said gaseous medium from said tubing comprising a second tube of smaller diameter passing through said first mentioned tube and terminating at a point beyond said circular plate whereby the gaseous medium in a zone in said tubing between said die and said plate may be maintained at a pressure sufficient to expand the tubing while in the plastic formative state to the desired diameter at a point beyond the point of extrusion; and the gaseous medium in the tubing beyond the point of expansion may be maintained at a pressure sufficient to keep the tubing expanded but insufficient to cause further expansion of said tubing.

10. An apparatus comprising in combination, an annular extrusion die, means for extruding a molten thermoplastic material through said die in the form of continuous seamless tubing, means for admitting a gaseous medium into said tubing in proximity to said die, and means for causing a back pressure in said tubing in the vicinity of the point of extrusion comprising a shaped cooler attached to said die and spaced therefrom and provided with means for circulating a liquid cooling medium through the interior of the cooler, said cooler having an opening through the central portion thereof within which is positioned a fan operative to blow said gaseous medium in the diretcion of the die face and countercurrent to the flow of gaseous medium at the point of emission thereof into said tubing whereby the gaseous medium in a zone in said tubing between said die and said shaped cooler may be maintained at a pressure sufficient to expand the tubing while in the plastic formative state to the desired diameter at a point beyond the point of extrusion; and the gaseous medium in the tubing beyond said zone may be maintained at a pressure sufficient to keep the tubing expanded but insufficient to cause further expansion of said tubing.

11. An apparatus comprising in combination, an annular extrusion die, means for extruding a molten thermoplastic material through said die in the form of continuous seamless tubing, means for admitting a gaseous medium into said tubing in proximity to said die, means for removing said gaseous medium from said tubing at a point in said tubing beyond the point of emission of said gaseous medium into said tubing, and means for causing a back pressure in said tubing in the vicinity of the point of extrusion comprising a shaped cooler attached to said die and spaced therefrom and provided with means for circulating a liquid cooling medium through the interior of said cooler; said means for admitting said gaseous medium into said tubing comprising a tube inserted through the center of said die and terminating in proximity to the face of said die, and said means for removing said gaseous medium from said tubing comprising a second tube of smaller diameter passing through said first mentioned tube and terminating at a point beyond said shaped cooler whereby the gaseous medium in a zone in said tubing between said die and said plate may be maintained at a pressure sufficient to expand the tubing while in the plastic formative state to the desired diameter at a point beyond the point of extrusion; and the gaseous medium in the tubing beyond the point of expansion may be maintained at a pressure sufficient to keep the tubing expanded but insufficient to cause further expansion of said tubing.

References Cited in the file of this patent
UNITED STATES PATENTS

| | | |
|---|---|---|
| 2,387,886 | Devol | Oct. 30, 1945 |
| 2,519,375 | Jargstorff et al. | Aug. 22, 1950 |
| 2,720,680 | Gerow | Oct. 18, 1955 |
| 2,814,071 | Allan et al. | Nov. 26, 1957 |